Patented July 1, 1930

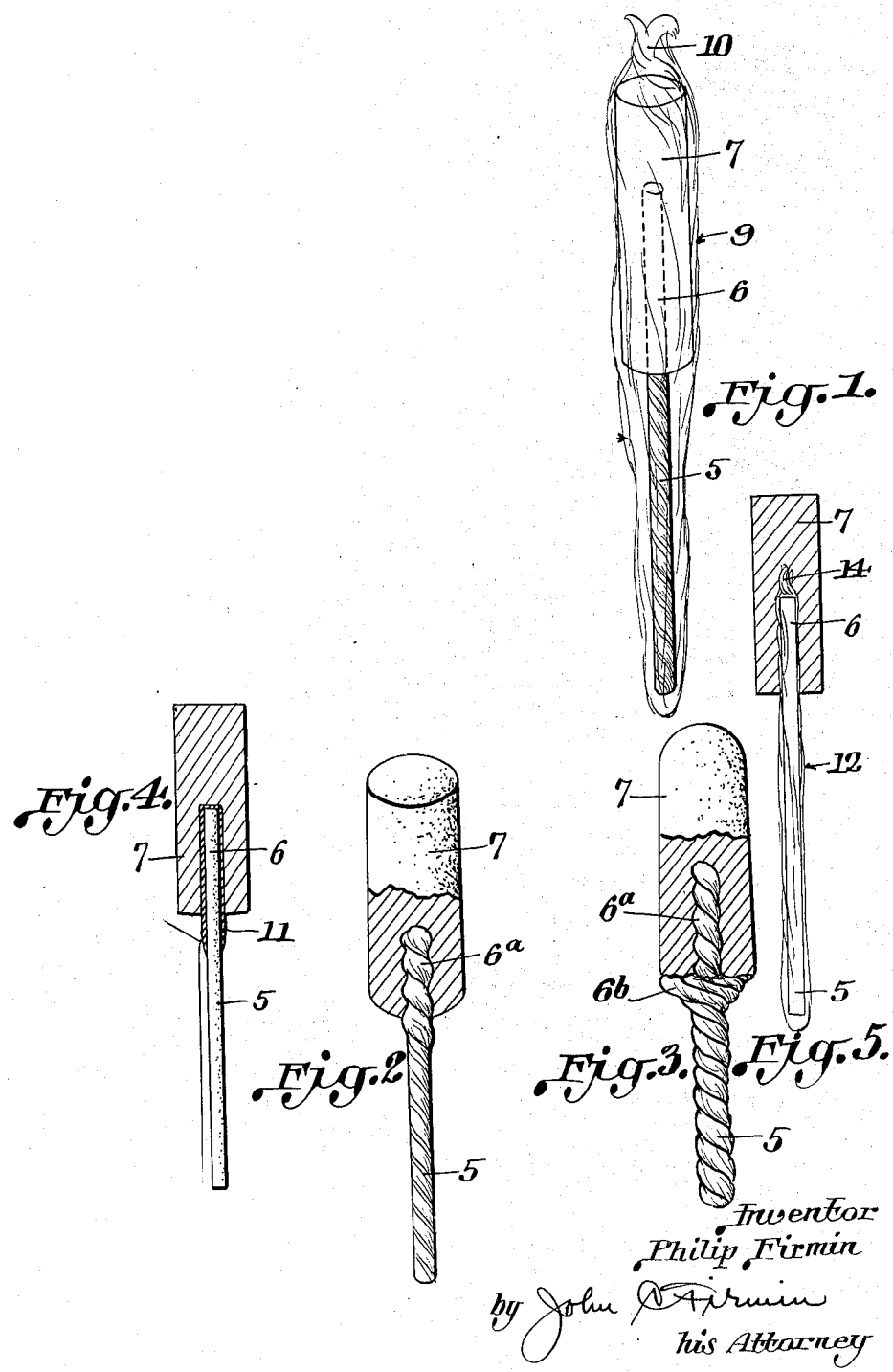

1,769,215

UNITED STATES PATENT OFFICE

PHILIP FIRMIN, OF WASHINGTON, DISTRICT OF COLUMBIA

FOOD PRODUCT

Application filed July 1, 1925. Serial No. 40,975.

This invention relates to improvements in food products particularly to such food products as lolly pops, ices, frozen danties, and other confections. An object of the invention is to provide a confection mounted in such a way, and upon such a handle that the confection may be eaten, or the handle may be eaten, or the entire article may be eaten.

A further object of the invention is to provide a confection with a handle to produce a single food product, and yet to separate the component parts in such way that either may be eaten and the remaining part be temporarily retained for future consumption.

A further object is to produce a confection which will be attractive in appearance, and will appeal particularly to the tastes of a child, at the same time furnishing a valuable article of diet.

With the above, and other objects in view, as may become apparent from the following disclosure, the invention consists in a novel combination of elements and specific features to be hereinafter enlarged upon and recited in the subjoined claims, the invention being illustrated in the accompanying drawings, wherein:

Fig. 1 shows a perspective view of the confection in which a wrapper covers the entire article;

Figs. 2 and 3 show a confection mounted on a handle of twisted candy having a corrugated surface.

Fig. 4 shows a food product in which the component parts are protected from the effects one upon the other; and Fig. 5 shows a food product similar to that shown in Fig. 1, but varying in that the entire handle is protected, not only where the confection, as an ice, surrounds the end of the handle, but where the handle is grasped to hold the article.

Referring to the drawings 5 represents a stick of candy inserted at 6 in a confection 7, the handle being wrapped as with waxed paper 8. The waxed paper may be extended beyond the handle as at 9 in Fig. 1, and twisted as at 10 so that the entire article is protected in a sanitary manner. The handle may be of a candy stick, twisted, particularly where it is inserted into and surrounded by the confection, shown at $6^a$ in Fig. 2 and it may further be twisted or enlarged as at $6^b$ where it joins the confection, thus forming a better support for the confection.

In Fig. 4 the stick 5 is separated from the confection 7 by an insoluble element 11 as for instance, by dipping the end of the stick in paraffin or cocoa butter. If the element 7 is a frozen confection the candy stick will be kept from melting by this element 11.

In Fig. 5 the candy handle is wrapped for its entire length with an insoluble element 12 as waxed paper, twisted as at 14. The confection, as an ice, being molded about one end of the wrapped stick to protect the stick from the frozen confection and to provide sanitary protection of the stick from contact in handling.

While in the foregoing, I have described specific embodiments, and have mentioned only certain possible modifications, it will be appreciated that in practice I do not limit myself to such specific details as herein set forth, but may resort to any practical modifications falling within the scope of the claims.

What I claim is:

1. A food product comprising a confection, an edible support for said confection, and a protective covering for that part of the support which would otherwise contact with the confection.

2. A food product comprising a frozen confection, a candy stick serving as a support for said confection, and a protective covering for the end of the candy stick which is surrounded by the frozen confection.

In testimony whereof I affix my signature.

PHILIP FIRMIN.